(12) United States Patent
Chan et al.

(10) Patent No.: US 8,816,988 B2
(45) Date of Patent: Aug. 26, 2014

(54) TOUCH SENSING APPARATUS

(75) Inventors: Chien-Yu Chan, Hsinchu (TW);
Chien-Kuo Wang, Zhubei (TW);
Shang-Ping Tang, Hsinchu (TW);
Ko-Yang Tso, New Taipei (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 367 days.

(21) Appl. No.: 13/316,202

(22) Filed: Dec. 9, 2011

(65) Prior Publication Data

US 2012/0169657 A1 Jul. 5, 2012

(30) Foreign Application Priority Data

Jan. 4, 2011 (TW) .............................. 100100187 A

(51) Int. Cl.
*G06F 3/041* (2006.01)
*G06F 3/044* (2006.01)

(52) U.S. Cl.
CPC .............. *G06F 3/0416* (2013.01); *G06F 3/044* (2013.01)
USPC ....................................................... 345/174

(58) Field of Classification Search
None
See application file for complete search history.

(56) References Cited

U.S. PATENT DOCUMENTS

| 8,154,525 | B2* | 4/2012 | Katsurahira | .................. 345/173 |
| 8,232,972 | B2* | 7/2012 | Huang et al. | .................. 345/173 |
| 8,624,870 | B2* | 1/2014 | Joharapurkar et al. | ........ 345/174 |
| 8,711,107 | B2* | 4/2014 | Fann et al. | ..................... 345/173 |
| 2007/0229468 | A1* | 10/2007 | Peng et al. | ..................... 345/173 |
| 2011/0025644 | A1* | 2/2011 | Lin et al. | ....................... 345/174 |

* cited by examiner

*Primary Examiner* — Jason Olson

(57) ABSTRACT

The present invention provides a touch sensing apparatus including a plurality of pins, a logic control module, and at least one driving/sensing control module. The logic control module generates a plurality of control signals having different control timings. Each driving/sensing control module is coupled with the logic control module and the pins, wherein the driving/sensing control module receives a first control signal of the control signals from the logic control module and controls the pins to execute a plurality of pin functions according to a first control timing of the first control signal, so that the pins simultaneously sense a plurality of analog data from a conductive thin film sensor.

8 Claims, 2 Drawing Sheets

TOUCH SENSING APPARATUS

BACKGROUND OF THE INVENTION

1. Field of the Invention

The present invention relates generally to a liquid crystal display; particularly, the present invention relates to a mutual capacitance touch sensing apparatus capable of sensing a plurality of data from a conductive thin film sensor simultaneously and avoiding the noise of a liquid crystal panel from influencing the sensing data.

2. Description of the Prior Art

As technology rapidly advances, conventional displays are progressively replaced by thin film transistor liquid crystal displays (TFT LCDs). TFT LCDs are widely used in TVs, flat displays, cell phones, tablet PCs, projectors, and other relevant electronic devices. For TFT LCDs having touch function, touch sensors play an important role among all other modules, and performance of the touch sensor affects the overall performance of LCD.

Generally, the conventional LCD having mutual capacitance touch sensing function includes a display panel, a conductive thin film sensor (e.g. ITO sensor), and a touch control chip, wherein the conductive thin film sensor includes a plurality of sensing lines and a plurality of driving lines, and the touch control chip includes a plurality of pins. The sensing lines are coupled with the pins respectively. When the driving line transmits a driving pulse to couple a small voltage at the sensing line, the touch control chip will sense the coupled voltage and determine according to the magnitude of the coupled voltage whether the conductive thin film sensor is touched.

However, the touch sensing method of the conventional liquid crystal display has some serious defects. For example, the scanning rate is too slow; the noise generated by the display panel seriously influences the operation of the touch control chip. In a worse case, the noise may cause the misjudgment of the location of the touch point. In order to avoid the noise generated by the panel, in some systems, an isolating layer is disposed between the conductive thin film sensor and the panel. However, such an approach inevitably increases the cost and the thickness of the whole device, impairing the mechanical design of device.

Hence, the present invention provides a touch sensing apparatus which can simultaneously sense a plurality of data of the conductive thin film sensor and avoid the sensed data to be influenced by the noise of liquid crystal display panel.

SUMMARY OF THE INVENTION

The present invention provides a touch sensing apparatus. In an embodiment, the touch sensing apparatus includes a plurality of pins, a logic control module, and at least one driving/sensing control module. The logic control module generates a plurality of control signals having different control timings. Each driving/sensing control module is coupled with the logic control module and the pins, wherein the driving/sensing control module receives a first control signal of the control signals from the logic control module and controls the pins to execute a plurality of pin functions according to a first control timing of the first control signal, so that the pins simultaneously sense a plurality of analog data from a conductive thin film sensor.

In practical applications, the touch sensing apparatus further includes the logic control module and a storage control module. The logic control module generates the control signals having different control timings according to an external synchronization signal, so that the pins sense in a time period that a liquid crystal display panel does not generate noise. The logic control module can generate the control signals having different control timings without the external synchronization signal, so that a digital filter filters noise generated from the liquid crystal display panel during the pins sensing. The storage control module includes a plurality of storage capacitors, and the storage control module stores the analog data sensed by the pins in the storage capacitors according to a second control timing of a second control signal of the control signals.

Compared to the prior arts, the touch sensing apparatus of the present invention only utilizes one set of the combination of an amplifying module and an analog/digital conversion module to sense a plurality of analog data from the conductive thin film sensor simultaneously, effectively increasing the scanning efficiency. In addition, the touch sensing apparatus of the present invention further utilizes the control signals having different control timings and performs the sensing process in a time period that the liquid crystal display panel does not generate noise, so that the noise generated by the display panel will not influence the operation of the touch control chip. In other words, misjudgment of the location of the touch point due to the influence of the noise of liquid crystal display panel on the sensed data can be avoided.

The detailed descriptions and the drawings thereof below provide further understanding about advantage and the spirit of the present invention.

DETAILED DESCRIPTION OF THE PREFERRED EMBODIMENT

One embodiment according to the present invention is a touch sensing apparatus. In the present embodiment, the touch sensing apparatus is a mutual capacitance touch sensing apparatus capable of sensing a plurality of data through the conductive thin film sensor simultaneously and avoid misjudgment of the location of touch point due to the influence of the noise of liquid crystal display panel on the sensed data.

Figure 1:
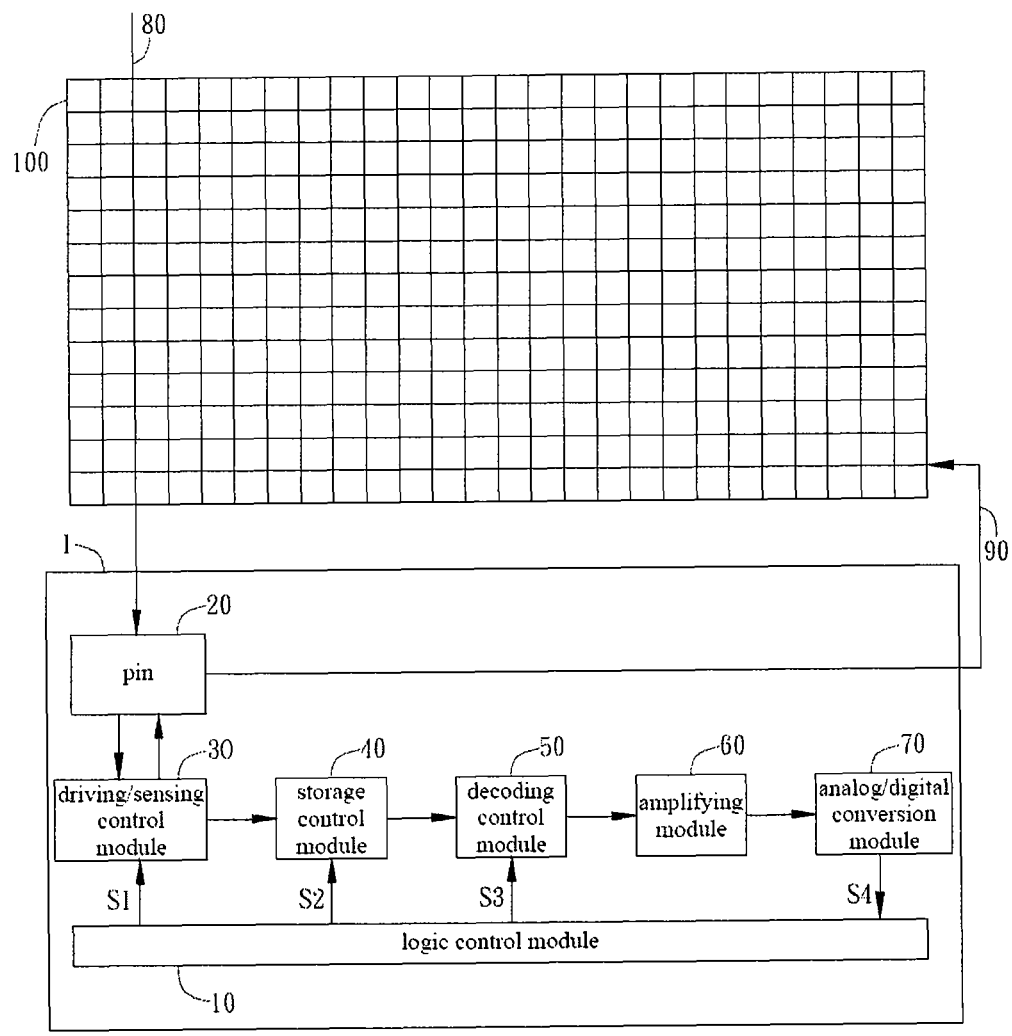
FIG. 1 is a schematic view of a touch sensing apparatus for sensing the touch point on a display panel.

Please refer FIG. 1; FIG. 1 is a schematic view of a touch sensing apparatus 1 for sensing the touch point on a display panel. As shown in FIG. 1, a liquid crystal display (LCD) panel includes a conductive thin film sensor 100 and the touch sensing apparatus 1. The LCD panel is generally attached to the bottom of the conductive thin film sensor 100, but the location of the LCD panel is not limited to the embodiment. The touch sensing apparatus 1 includes a logic control module 10, a plurality of pins 20, at least one driving/sensing control module 30, at least one storage control module 40, at least one decoding control module 50, at least one amplifying module 60, and an analog/digital conversion module 70. The driving/sensing control module 30 is coupled with the logic control module 10 and the pins 20. The storage control module 40 is coupled with the logic control module 10 and the driving/sensing control module 30. The decoding control module 50 is coupled with the logic control module 10 and the storage control module 40. The analog/digital conversion module 70 is coupled with the amplifying module 60 and the logic control module 10.

In the present embodiment, the logic control module 10 generates a plurality of control signals having different control timings. For example, the logic control module 10 generates a first control signal S1, a second control signal S2, and a third control signal S3. The first control signal S1, the second control signal S2, and the third control signal S3 respectively have a first control timing, a second control timing, and a third control timing for controlling the driving/sensing control module 30, the storage control module 40, and the decoding control module 50 respectively, but not limited thereto.

It is noted that the pins 20 included in the touch sensing apparatus 1 have more than one function and can switch between different functions based on practical requirements. Examples of the functions include, but are not limited to, driving function, sensing function, ground function, or floating function.

Each driving/sensing control module 30 receives the first control signal S1 from the logic control module 10 and controls the pins 20 to execute the pin functions according to the first control timing of the first control signal S1, so that the pins 20 can sense a plurality of analog data from the conductive thin film sensor 100 simultaneously.

As shown in FIG. 1, the conductive thin film sensor 100 includes a plurality of sensing lines 80 and a plurality of driving lines 90, wherein the driving lines 90 are arranged perpendicular to the sensing lines 80. It is noticed that the driving lines 90 and the sensing lines 80 can be interchanged with each other; in other words, the driving lines 90 shown in FIG. 1 can serve as the sensing lines, and the sensing lines 80 shown in FIG. 1 can serve as the driving lines, wherein the arrangement of sensing lines and driving lines can be controlled by the touch sensing apparatus 1. In the present embodiment, different pins 20 can respectively scan on a driving line 90 and sense a plurality of sensing lines 80 simultaneously, so that a plurality of analog data can be sensed. The logic control module 10 of the touch sensing apparatus 1 can control a specific pin 20 of the pins 20 to execute the sensing process at a specific timing.

When the logic control module 10 transmits the first control signal S1 to the driving/sensing control module 30, the driving/sensing control module 30 controls the pins 20 to execute the sensing function according to the first control timing of the first control signal S1, so that the pins 20 can sense the plurality of analog data from the conductive thin film sensor 100 simultaneously.

It is noted that the logic control module 10 can generate the control signals S1~S3 having different control timings according to an external synchronization signal or not according to the external synchronization signal, so that the pins 20 can sense in a time period that the LCD panel does not generate noise to avoid the analog data sensed by the pins 20 to be influenced by the noise of the LCD panel.

In the present embodiment, each storage control module 40 includes a plurality of storage capacitors (not shown). When the storage control module 40 receives the second control signal S2 from the logic control module 10, the storage control module 40 stores the analog data sensed by the pins 20 in the storage capacitors according to the second control timing of the second control signal S2.

It is noted that, because each storage control module 40 includes the plurality of storage capacitors, the touch sensing apparatus 1 can sense the analog data simultaneously, and the plurality of analog data sensed by the sensing lines 80 can be stored in the plurality of storage capacitors.

After the storage control module 40 stores the plurality of analog data in the storage capacitors, the conductive thin film sensor 100 will execute a discharge process, avoiding the residual charge of the conductive thin film sensor 100 to influence the sensing accuracy of the pins 20. The decoding control module 50 receives the third control signal S3 from the logic control module 10 and decodes the plurality of analog data stored in the storage capacitors according to the third control timing of the third control signal S3.

In the present embodiment, the amplifying module 60 amplifies the analog data decoded by the decoding control module 50; the analog/digital conversion module 70 converts the amplified analog data into a plurality of digital data S4. In practice, the amplifying module 60 can be an arbitrary type of amplifier; the analog/digital conversion module 70 can be an arbitrary type of analog/digital converter. However, the amplifying module 60 and the analog/digital conversion module 70 are not limited to the embodiment.

Figure 2:
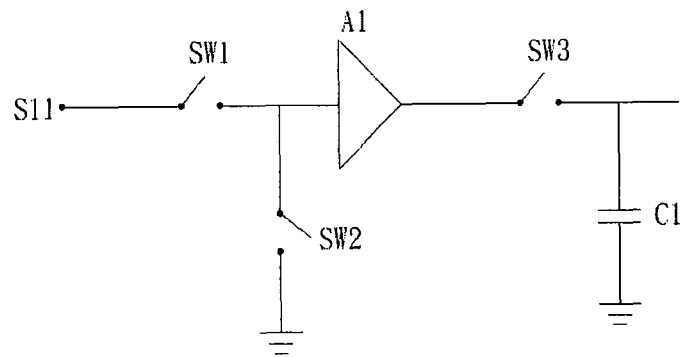
FIG. 2 is a schematic view of a one-to-one corresponding relationship between the pins and the storage capacitors of the present invention.

Please refer to FIG. 2; FIG. 2 is a schematic view of a one-to-one corresponding relationship between the pins and the storage capacitors of the present invention.

As shown in FIG. 2, the touch sensing apparatus 1 includes a pin S11, a buffer A1, a storage capacitor C1, a sensing switch SW1, a ground switch SW2, and a storage switch SW3. The sensing switch SW1 is coupled with the pin S11 and an input end of the buffer A1 and controls the pin S11 to execute a certain function according to the first control signal S1 transmitted from the logic control module 10. In a preset condition, the sensing switch SW1, the ground switch SW2, and the storage switch SW3 are all in open state.

In the present embodiment, the pin S11 has the sensing function, wherein the pin S11 and the storage capacitor C1 have the one-to-one corresponding relationship, i.e. one pin corresponds to one storage capacitor. When the logic control module 10 transmits the first control timing of the first control signal S1 to activate the sensing switch SW1 (i.e. the switch SW1 is in closed state), the pin S11 can execute the sensing process on the conductive thin film sensor 100. The analog data sensed by the pin S11 is transmitted to the input end of the buffer A1 and then processed through the buffer A1. The logic control module 10 can generate control signals having different control timings according to an external synchronization signal or not according to the external synchronization signal, so that the pin S11 senses in a time period that the conductive thin film sensor 100 does not generate noise to avoid the influence of the noise from the LCD panel on the analog data sensed by the pin S11.

The storage switch SW3 is coupled with an output end of the buffer A1 and the storage capacitor C1. The logic control module 10 transmits the second control signal S2 to activate the storage switch SW3 (i.e. the storage switch SW3 is in closed state), so that the analog data can be stored in a form of voltage in the storage capacitor C1. The ground switch SW2 is coupled with the sensing switch SW1 and the input of the buffer A1. After the analog data is stored in the storage capacitor C1, the logic control module 10 controls the storage switch SW3 to be deactivated (i.e. in open state) and controls the ground switch SW2 to be activated (i.e. in closed state), so that the conductive thin film sensor 100 executes the discharge process, releasing the residual charge of the conductive thin film sensor 100. When the discharge process is completed, the logic control module 10 controls the sensing switch SW1 to be deactivated (i.e. in open state). As shown in FIG. 1, the decoding control module 50 decodes the analog data stored in the storage capacitor C1 according to the third control timing of the third control signal S3. The amplifying module 60 amplifies the analog data decoded by the decoding control module 50, and the analog/digital conversion module 70 converts the amplified analog data into the digital data.

Figure 3:
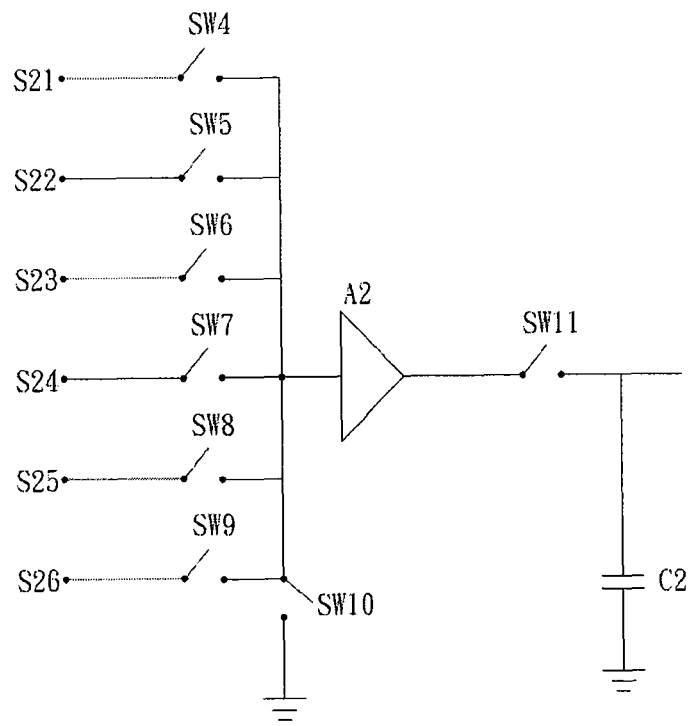
FIG. 3 is a schematic view of a plurality-to-one corresponding relationship between the pins and the storage capacitors of the present invention.

Please refer to FIG. 3; FIG. 3 is a schematic view of a plurality-to-one corresponding relationship between the pins and the storage capacitors of the present invention.

As shown in FIG. 3, the touch sensing apparatus 1 includes a plurality of pins (e.g. the first pin S21 to the sixth pin S26), a buffer A2, a storage capacitor C2, a plurality of sensing switches (e.g. the first sensing switch SW4 to the sixth sensing switch SW9), a ground switch SW10, and a storage switch SW11. The first sensing switch SW4 to the sixth sensing switch SW9 are respectively coupled with the first pin S21 to the sixth pin S26 and an input end of the buffer A2. The first sensing switch SW4 to the sixth sensing switch SW9 respectively control the first pin S21 to the sixth pin S26 to execute the corresponding function according to the first control signal S1 transmitted from the logic control module 10. In a preset condition, the first sensing switch SW4 to the sixth sensing switch SW9, the ground switch SW10, and the storage switch SW11 are all in open state.

In the present embodiment, the first pin S21 to the sixth pin S26 have the sensing function, wherein, the first pin S21 to the sixth pin S26 and the storage capacitor C2 have the plurality-to-one corresponding relationship, i.e. a plurality of pins correspond to one storage capacitor. When the logic control module 10 transmits the first control timing of the first control signal S1 and controls the first sensing switch SW4 to be activated, the conductive thin film sensor 100 is sensed by the pin S21. The analog data sensed by the pin S21 is then transmitted to the input end of the buffer A2 and processed through the buffer A2.

The storage switch SW11 is coupled with an output end of the buffer A2 and the storage capacitor C2. The logic control module 10 transmits the second control signal S2 to control the storage switch SW11 to be activated (i.e. in the closed state), so that the analog data are stored in a form of voltage in the storage capacitor C2. The ground switch SW10 is coupled with the first sensing switch SW4 to the sixth sensing switch SW9 and an input end of the buffer A2.

After the analog data are stored in the storage capacitor C2, the logic control module 10 controls the storage switch SW11 to be deactivated (i.e. in the open state) and controls the ground switch SW10 to be activated (i.e. in the closed state), so that the conductive thin film sensor 100 executes the discharge process. The logic control module 10 generates the control signals having different control timings according to the external synchronization signal, so that the pin S21 senses in a time period that the LCD panel does not generate noise to avoid the analog data sensed by the pin S21 to be influenced by the noise of the LCD panel.

When the logic control module 10 transmits the first control signal S1 to activate the sensing switch SW5 and deactivate the other switches, as shown in FIG. 3, the conductive thin film sensor 100 is sensed by the pin S22. The analog data sensed by the pin S22 is transmitted to the input end of the buffer A2 and processed in the buffer A2.

The logic control module 10 generates the control signals having different control timings according to the external synchronization signal or not according to the external synchronization signal, so that the second pin S22 senses in a time period that the LCD panel does not generate noise to avoid the analog data sensed by the second pin S22 to be influenced by the noise of the LCD panel. The logic control module 10 transmits the second control signal S2 to control the storage switch SW11 to be activated (i.e. in the closed state), so that the analog data are stored in a form of voltage in the storage capacitor C2. The ground switch SW10 is coupled with the first sensing switch SW4 to the sixth sensing switch SW9 and the input end of the buffer A2. After the analog data are stored in the storage capacitor C2, the logic control module 10 controls the storage switch SW11 to be deactivated (i.e. in the open state) and controls the ground switch SW10 to be activated (i.e. in the closed state), so that the conductive thin film sensor 100 executes the discharge process. When the discharge process is completed, the logic control module 10 controls the second sensing switch SW5 to be in the open state.

Because the touch sensing apparatus 1 of the present invention includes the storage capacitors, the logic control module 10 can sense the analog data simultaneously through the sensing lines 80, and the analog data sensed through the sensing lines 80 is stored in the storage capacitors. In addition, the logic control module 10 generates the control signals having different control timings according to an external synchronization signal and respectively controls the first sensing switch SW4 to the sixth sensing switch SW9, the ground switch SW10, and the storage SW11, so that the touch sensing apparatus 1 can store the analog data of all the sensing lines 80 of the conductive thin film sensor 100 in the storage capacitors according to different time periods, and the analog data is then processed by the logic control module 10. In addition, the logic control module 10 can generate the control signals having different control timings according to the external synchronization signal, so that the first pin S21 to the sixth pin S26 senses in a time period that the conductive thin film sensor 100 does not generate noise to avoid the analog data sensed by the pins to be influenced by the noise of the LCD panel.

Compared to the prior arts, the touch sensing apparatus of the present invention only utilizes one set of the combination of the amplifying module and the analog/digital conversion module to sense a plurality of analog data from the conductive thin film sensor, resulting in the increase in scanning efficiency. Moreover, the touch sensing apparatus of the present invention further utilizes the control signals having different control timings to perform the sensing process in a time period that the LCD panel does not generate noise, so that the misjudgment of the location of touch point due to the influence of the noise of liquid crystal display panel on the sensed data can be avoided.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A touch sensing apparatus, comprising:
   a plurality of pins;
   a logic control module generating a plurality of control signals having different control timings;
   at least one driving/sensing control module coupled with the logic control module and the pins, wherein the driving/sensing control module receives a first control signal of the control signals from the logic control module and controls the pins to execute a plurality of pin functions according to a first control timing of the first control signal, so that the pins simultaneously sense a plurality of analog data from a conductive thin film sensor; and
   at least one storage control module, wherein each storage control module comprises a plurality of storage capacitors, the at least one storage control module is coupled with the logic control module and the at least one driving/sensing control module and stores the analog data sensed by the pins in the storage capacitors according to a second control timing of a second control signal of the control signals;

wherein a pin of the pins and a storage capacitor of the storage capacitors have a one-to-one corresponding relationship, so that the analog data sensed by the in is stored in a form of voltage in the corresponding storage capacitor; a buffer is disposed between the pin and the storage capacitor, a sensing switch is coupled with the pin and an input end of the buffer, a storage switch is coupled with an output end of the buffer and the storage capacitor, one end of a ground switch is coupled with the sensing switch and the input end of the buffer and the other end of the ground switch is grounded.

2. The touch sensing apparatus of claim 1, wherein the conductive thin film sensor comprises a plurality of scanning lines, the pins respectively scan one of the scanning lines for sensing the analog data.

3. The touch sensing apparatus of claim 1, wherein the pin functions comprise a driving function, a sensing function, a grounding function, and a floating function.

4. The touch sensing apparatus of claim 1, wherein the conductive thin film sensor executes a discharge process after the at least one storage control module stores the analog data in the storage capacitors.

5. The touch sensing apparatus of claim 1, further comprising:

at least one decoding control module coupled with the logic control module and the at least one storage control module, wherein the decoding control module decodes the analog data stored in the storage capacitors according to a third control timing of a third control signal of the control signals.

6. The touch sensing apparatus of claim 5, further comprising:

at least one amplifying module coupled with the at least one decoding control module, wherein the amplifying module amplifies the analog data decoded by the at least one decoding control module; and an analog/digital conversion module coupled with the at least one amplifying module and the logic control module, wherein the analog/digital conversion module converts the amplified analog data into a plurality of digital data and transmits the digital data to the logic control module.

7. The touch sensing apparatus of claim 1, wherein the logic control module generates the control signals having different control timings according to an external synchronization signal, so that the pins sense in a time period that a liquid crystal display panel does not generate noise during the pins sensing.

8. A touch sensing apparatus, comprising:

a plurality of pins;

a logic control module generating a plurality of control signals having different control timings;

at least one driving/sensing control module coupled with the logic control module and the pins, wherein the driving/sensing control module receives a first control signal of the control signals from the logic control module and controls the pins to execute a plurality of pin functions according to a first control timing of the first control signal, so that the pins simultaneously sense a plurality of analog data from a conductive thin film sensor; and at least one storage control module, wherein each storage control module comprises a plurality of storage capacitors, the at least one storage control module is coupled with the logic control module and the at least one driving/sensing control module and stores the analog data sensed by the pins in the storage capacitors according to a second control timing of a second control signal of the control signals;

wherein the pins and a storage capacitor of the storage capacitors have a plurality-to-one corresponding relationship, so that the analog data sensed by the pins corresponding to the same storage capacitor is stored in a form of voltage in the storage capacitor; a buffer is disposed between the pins and the storage capacitor, sensing switches are coupled with the pins and an input end of the buffer respectively, a storage switch is coupled with an output end of the buffer and the storage capacitor, one end of a ground switch is coupled with the sensing switches and the input end of the buffer and the other end of the ground switch is grounded.

* * * * *